Oct. 5, 1926.
G. DRAGONETTI
1,602,070
SELENIUM CELL WITHOUT INERTIA
Filed Jan. 31, 1924
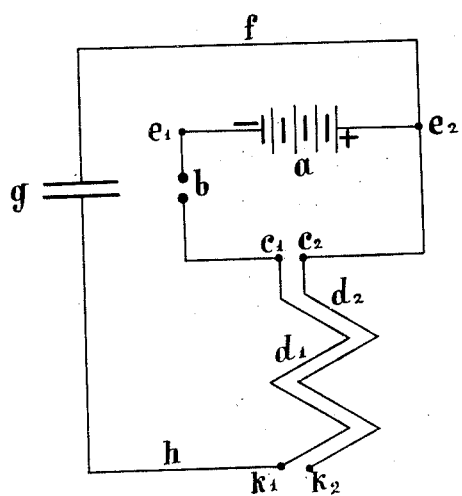
Inventor:
Giovanni Dragonetti Patented Oct. 5, 1926.

1,602,070

UNITED STATES PATENT OFFICE.

GIOVANNI DRAGONETTI, OF ROME, ITALY.

SELENIUM CELL WITHOUT INERTIA.

Application filed January 31, 1924, Serial No. 689,763, and in Italy February 12, 1923.

My invention relates to improvements in selenium cells adapted to be used in many contrivances in which are made applicable their peculiar photoelectric properties, that is, the varying resistance which is produced in the selenium through the variation of the intensity of the light by which it is struck. In a peculiar physical state, selenium when in the darkness has a very considerable resistance, but said resistance greatly diminishes upon the selenium being exposed to the action of light.

However, whilst the variation in the conductivity of selenium, i. e., as the resistance is reduced, is produced nearly instantaneously upon the selenium being struck by the light, the variation in the opposite sense, that is in the sense of the increase of the resistance, upon the action of light being stopped, is delayed a certain time. This delay has been named the "hysteresis" or also the "inertia" of the selenium.

Now since in many cases a very rapid variation in the resistance of the selenium would be required, the possibility of using selenium is necessarily limited because if the periods of time between two successive illuminations are not greater than the period of time required to re-establish the primitive resistance, the effect of the selenium cell is damped and the cell, upon a certain frequency of alternations being exceeded, will not work at all.

The object of the present invention is to eliminate said drawback by such arrangements as to produce the variations of the resistance of the selenium cell with the same speed upon the diminution as well as the increase of resistance. This result I obtain by inserting a condenser between one pole of the battery feeding the cell and that end of the wire of the cell which is connected to the other pole of the battery.

Such an arrangement is shown in the annexed drawing, in which —a— represents a battery of primary cells, or a storage battery, feeding the circuit; —b— is the apparatus in which is utilized the variability of the current produced, and one side of which is connected to one of the poles of the battery while its other side, at $c_1$, is connected to the end of one of the wires $d_1$ forming the winding of the selenium cell. The end $e_2$ of the other wire $d_2$ is connected to the other pole of the battery. However from the point $e_2$ of the wire connecting the end $c_2$ with the battery, branches off a wire —f— which is ending at one of the plates of a condenser —g—, the other plate of which is connected to the free end $k_1$ of the wire $d_1$.

The arrangement may also be such that the apparatus —b— is inserted between the points $c_2$ and $e_2$ while the condenser —g—, is inserted between the points $c_1$ and $k_2$. The apparatus —b— is thus always located between one of the poles of the battery and the end of one of the wires of the selenium cell, while the condenser is located between the other end of the same wire and the other pole of the battery.

With such an arrangement both the increase and the decrease of resistance are produced instantaneously, so that the frequency of the variations may be increased at will without thus diminishing the efficiency of the cell.

I claim as my invention:

In combination with a selenium cell of the kind herein described, having its winding formed of two parallel wires and one end of each wire connected to one of the poles of the source of current feeding the cell, an arrangement to produce with the same speed the variations of the resistance of said cell upon a diminution as well as upon an increase of the intensity of light, said arrangement comprising a condenser inserted between the free end of one of said wires and that pole of the source of current which is connected to the end of the other wire.

In testimony whereof I affix my signature this 14th day of January 1924.

GIOVANNI DRAGONETTI.